Patented Sept. 27, 1949

2,483,194

UNITED STATES PATENT OFFICE 2,483,194

POLYMER AND COPOLYMER OF ALLYL CARBAMATE

Clyde E. Gleim, Akron, Ohio, assignor to Wingfoot Corporation, Akron, Ohio, a corporation of Delaware No Drawing. Application February 2, 1946, Serial No. 645,232

2 Claims. (Cl. 260—77.5)

This invention relates to the mono esters of carbamic acid, to a method of preparing the same and to certain polymers and copolymers thereof.

While it is known to prepare n-butyl carbamate in relatively high yields by refluxing a solution of urea in an excess of n-butyl alcohol for 30 hours, application of this same procedure to an alcohol boiling below about 116° C. is not practical since yields of only about 10% of the desired carbamate are obtained. It has now been discovered that relatively high yields of the low-boiling aliphatic alcohol esters of carbamic acid may be obtained if the esterification is carried out in a suitable pressure apparatus at a temperature of about 125°–175° C. for a sufficient length of time, usually at least about 30 hours. The same high yields may also be obtained in shorter periods of time, on the order of 5 hours, when an alkaline catalyst is employed.

Of the esters which may be prepared in this manner, the carbamic acid esters of unsaturated aliphatic monohydroxy alcohols having a double bond adjacent to the second carbon atom from the hydroxyl group are found to be readily polymerized to hard, insoluble, thermoplastic and generally crystal-clear polymeric masses. These carbamates may also be copolymerized with other polymerizable monomers to form infusible, insoluble, thermosetting resinous masses having many industrial applications.

The carbamates of this invention may be prepared in relatively high yields by reacting urea with a saturated or an unsaturated aliphatic alcohol boiling below about 116° C. at a temperature between about 125° and about 175° C. for about 30 hours until the reaction is substantially complete, or longer, where say a catalyst is not present, while removing the by-product ammonia gas. Any suitable pressure vessel or autoclave may be used, equipped with means for continuously or intermittently removing the ammonia gas generated in this type of reaction. The urea and the low-boiling alcohol generally react in equal molecular proportion; but it is desirable that an excess of the alcohol be present. Usually, the pressures developed range from between about 10 pounds per sq. in. to about 60 pounds per sq. in. gauge, and it is desirable that the pressure be not less than about 10–20 pounds per sq. in.

When it is desirable to reduce the reaction time much below 30 hours, which substantially represents the time required when following the above-described method, any suitable non-volatile catalyst which does not promote polymerization and which tends to aid in the removal of ammonia may be used to speed up the reaction. Catalysts most suitable are the alkaline catalysts, such as the hydroxides of the alkali and alkaline earth metals, e. g., those of sodium potassium and calcium. Sodium alkoxides may also be used, as, for example, sodium methoxide. Anhydrous zinc chloride, anhydrous ammonium chloride, the tertiary amine hydrochlorides, and ammonium chloride, also operate to catalyze the reaction and permit the completion of the synthesis in periods varying between about 5 and about 10 hours.

Another method of synthesizing the carbamates of this invention comprises the reaction of ammonia with an aliphatic alcohol-chloroformate (RCOCl) in which R is the residue of an aliphatic alcohol. Generally, 1 part of RCOCl dissolved in an inert solvent such as benzene is caused to react with 2 parts of ammonia by passing the ammonia gas into the solution at about 20° C. to the reflux temperature of the mixture until the reaction is complete.

A further method of preparing these carbamates comprises the reaction of 1 part of carbamyl chloride dissolved in an inert solvent, as benzene, with 1 part of an aliphatic alcohol boiling below about 116° C. at a temperature between about 20° C. and about the reflux temperature of the mixture.

By the term "an aliphatic alcohol boiling below about 116° C." is meant to include, among others, those alcohols having the general formula $C_nH_{2n+1}OH$ in which $n$ has a value of 1 to 4. Alcohols included in this group are methyl alcohol, ethyl alcohol, propyl alcohol and isopropyl alcohol. The term also includes the unsaturated alcohols such as allyl alcohol.

The above-described carbamates of unsaturated alcohols are easily polymerized to hard, fusible, thermoplastic and generally crystal-clear masses by heating the carbamate at any temperature from about 25° C. to about 100° C. or up to the decomposition temperature of the product being polymerized. It has been found, however, that temperatures in the range between about 50° C. and about 90° C. are in general the most suitable when heating in the presence of a catalyst. The polymerization may be carried out in the presence or absence of a polymerization catalyst, and its presence or absence will determine the time necessary to complete the polymerization reaction. Where the polymerization reaction is slow, it is desirable to add a polymerization catalyst, as, for example, benzoyl peroxide, hydrogen peroxide, ammonium persulfate, sodium perborate, etc. The catalyst may be used in an amount between about 1% and about 10% of the total weight of the monomer being polymerized.

It has also been discovered that the characteristic of polymerizability is not confined to the allyl carbamate hereinbefore described but is a characteristic also possessed by those carbamates having an ester group containing a double bond adjacent to the second carbon atom from the carboxyl group. These carbamates may be termed the carbamic acid monoesters of a monohydric unsaturated aliphatic alcohol having a double bond adjacent to the second carbom atom from the alcohol hydroxyl group. The unsaturated alcohols are classifiable into two groups, one group being characterized by the atomic grouping HOC.C:C, which group includes 3-chloro-2-propen-1-ol, coniferyl alcohol [3-(4-hydroxy-3-methoxy-phenyl)-2-propen-1-ol], 2-methyl-2-propen-1-ol, 1-phenyl-2-propen-1-ol (alpha-vinyl benzyl alcohol), 3-phenyl-2-propen-1-ol(cinnamyl alcohol), 1-(p-methoxyphenyl)-3-phenyl-2-propen-1-ol, 1,1,3-triphenyl-2-propen-1 - ol, 3,3 - dichloro - 2 - methyl-2-propen-1-ol, 1,1,3,3 - tetrakis(p-methoxyphenyl) - 2 - propen-1-ol, 1,2,3-triphenyl-2-propen-1-ol, 2-buten-1-ol, 4-methyl-3-penten-2-ol, 1-hexen-3-ol, 2-methyl-3-hexen-2-ol, 2-hexen-1-ol, 4-hexen-3-ol, 2-methyl-3-octen-2-ol.

The second group is characterized by the atomic grouping HOC:C which group includes 1-phenyl-ethenol($\alpha$ - methylene - benzyl alcohol), 2,2-dimesityl-ethenol, triphenyl-ethenol, 2,2-bis-(2,3,4,6 - tetramethyl phenyl) - ethenol, 1,2 - dimesityl - ethenol, 2,2-dimesityl-ethenol, 1,2-dimesityl - 2 - phenyl-ethenol, 2-mesityl-2-phenyl-ethenol, 2-phenyl-2-(2,3,4,6-tetramethylphenyl) - ethenol, 1-propen-1-ol, 1,2-diphenyl-1-propen-1-ol.

The vinyl carbamates having the nucleus H$_2$NCO$_2$C:CH$_2$ may be made by reacting a vinyl chloroformate having the formula

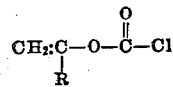

in which R may be hydrogen or any monovalent organic radical other than hydrogen, with ammonia. The vinyl chloroformates may be produced by pyrolysing ethylene glycol bis (chloroformate) at a temperature sufficient to cause the elimination of CO$_2$ and HCl, generally 400 to 600° C. Details of the procedure are disclosed in U. S. 2,377,085.

The resulting polymers are insoluble in water, acetone, aliphatic alcohols, benzene and other common organic solvents. The polymers have a Rockwell hardness of about M60 to about M90 and have a softening point above about 50° C., generally in the range of about 60–100° C.

The described carbamates may also be copolymerized with other polymerizable unsaturated compounds, as, for example, styrene, pinene, camphene, monovinyl acetylene, divinyl acetylene, vinyl ethinyl, alkyl carbinols, vinyl acetate, vinyl chloride, the acrylates such as butyl acrylate, methyl methacrylate, methyl alpha chloracrylate, furyl acrylate, acrylic amide, acrylic nitrile, etc. In fact, copolymerization may be effected with any of the known polymerizable organic monomeric compounds, especially those having a terminal methylene group, and preferably those in which the terminal methylene group is attached by an ethylenic double bond to a carbon atom which is, in turn, attached to a negative group, i. e., RCO—, RCO$_2$—, NO$_2$—, C$_6$H$_5$—, C$_{10}$H$_7$—, RO—, NC—, RNHCO—, NH$_2$CO—, (RCO)$_2$N—, RCONH—, Cl—, CH$_2$:CH—, RCH:CH—, C H : C—, H O O C C H : C H—, CH$_2$:CHO—, R being alkyl or aryl. Examples of the preferred class are the vinyl or vinylidene derivatives, e. g., styrene, vinyl acetate, methyl methacrylate, unsymmetrical dichlorethylene or vinylidene chloride, vinyl chloride, etc.

The copolymerization may be carried out under the same conditions described with respect to the polymerization of the carbamates. At lower temperatures than those described, copolymerization is usually rather slow, while at higher temperatures more elaborate equipment is required.

Copolymerization may be accelerated, when necessary, by the usual polymerization catalysts, such as hydrogen peroxide, benzoyl peroxide, ammonium persulfate and sodium perborate, as well as by increasing the temperature, pressure, or concentration of the emulsifying agent, or by adjusting the hydrogen ion concentration, or by the choice of emulsifying agent. A suitable emulsifying agent is sodium lauryl sulfate.

The following examples illustrate specific embodiments of the invention. These examples are intended to be illustrative only and are not intended to limit the scope of the invention. The term "parts" whenever hereinafter used signifies "parts by weight."

EXAMPLE 1

*Allyl carbamate and polymer*

A solution of 90 parts of urea in 352 parts of allyl alcohol was heated in a pressure vessel at a temperature of 158–162° C. for a period of 30 hours, during which time by-product ammonia gas was bled off at intervals from 45 pounds per sq. in. gauge pressure to 25 pounds per sq. in. gauge pressure, and was then continuously bled off, care being taken not to allow the pressure to drop below 25 pounds per sq. in. A 75% yield of allyl carbamate was recovered by distilling the reaction mixture. Twenty parts of the carbamate was heated at 67–75° C. for 24 hours in the presence of 5 parts of benzoyl peroxide to produce a substantially colorless transparent polymeric mass, which had a Rockwell hardness at room temperature of M95, a softening point of about 75° C. and was insoluble in water, alcohol, acetone, and benzene.

EXAMPLE 2

*Propyl carbamate*

A solution of 90 parts of urea in 352 parts of n-propyl alcohol was heated in a pressure vessel at a temperature of 158–162° C. for a period of 30 hours, during which time by-product ammonia gas was bled off at intervals from 45 pounds per sq. in. gauge pressure to 25 per sq. in. gauge pressure, and then was continuously bled off, care being taken not to allow the pressure to drop below 25 pounds per sq. in. A 75% yield of propyl carbamate was recovered after distillation of the reaction mixture.

EXAMPLE 3

*Ethyl carbamate*

A solution of 90 parts of urea in 352 parts of ethyl alcohol was heated in a pressure vessel at a temperature of 158–162° C. for a period of 30 hours, during which time by-product ammonia gas was bled off at intervals from 45 pounds per sq. in. gauge pressure to 25 pounds per sq. in. gauge pressure. A 75% yield of ethyl carbamate was obtained after distillation of the reaction mixture.

EXAMPLE 4

Methyl carbamate

A solution of 90 parts of urea in 352 parts of methyl alcohol was heated in a pressure vessel at a temperature of 158–162° C. for a period of 30 hours, during which time by-product ammonia gas was bled off at intervals from 45 pounds per sq. in. gauge pressure to 25 pounds per sq. in. gauge pressure. A 75% yield of methyl carbamate was recovered after distillation of the reaction mixture.

EXAMPLE 5

Allyl carbamate and polymer

A solution of 90 parts of urea in 352 parts of allyl alcohol was heated at 155–162° C. for 5 hours in the presence of 3 parts of sodium methylate. A yield of 75% of allyl carbamate was recovered after distillation of the reaction mixture. Twenty parts of carbamate was heated at 67–75° C. for 24 hours in the presence of 5 parts of benzoyl peroxide to produce a substantially colorless, transparent, polymeric mass, which had a Rockwell hardness at room temperature of M92 and which had a softening point of about 72° C.

EXAMPLE 6

Allyl carbamate and polymer

A solution of 160 parts of carbamyl chloride in 300 parts of benzene was added to 125 parts of allyl alcohol at 50° C. to produce a yield of 70% of allyl carbamate. Twenty parts of the carbamate was heated at 67–75° C. for 24 hours in the presence of 5 parts of benzoyl peroxide to form a substantially colorless, transparent, polymeric mass, which had a Rockwell hardness at room temperature of M97 and which had a softening point of about 77° C.

EXAMPLE 7

Allyl carbamate and polymer

A solution of 1210 parts of allyl chloroformate in 1750 parts of benzene was treated with anhydrous ammonia gas at atmospheric pressure and a temperature of 25–50° C. until an excess of ammonia gas had been added. The ammonium chloride by-product was separated. Distillation of the solution gave a yield of 90% of allyl carbamate. Twenty parts of the carbamate was heated at 67–75° C. for 24 hours in the presence of 5 parts of benzoyl peroxide to produce a substantially colorless, transparent, polymeric mass, which had a Rockwell hardness at room temperature of M98 and which had a softening point of about 78° C.

EXAMPLE 8

Allyl carbamate-diethylene glycol bis(allyl carbonate) copolymer

A quantity of 90 parts of allyl carbamate and 10 parts of diethylene glycol bis(allyl carbonate) was heated in the presence of 5% benzoyl peroxide at 65–75° C. for a period of 24 hours to give a transparent, thermosetting, infusible resin having a Rockwell hardness of M98, and being insoluble in all common organic solvents.

The final hardness of the carbamate polymer, including both the carbamates polymerized alone and with other copolymerizable monomers, may be varied by controlling the time of heating in both instances and by varying the monomer ratio in the second instance.

The polymers and copolymers of this invention are useful as a low pressure laminating resin, as a film-forming ingredient for lacquers, paints, and varnishes.

Suitable changes may be made in the details of the process without departing from the spirit or scope of the preesnt invention, the proper limits of which are defined in the appended claims.

I claim:
1. A polymer of allylcarbamate.
2. The copolymer of 90 parts of allylcarbamate and 10 parts of diethylene glycol bis(allyl carbonate).

CLYDE E. GLEIM.

REFERENCES CITED

The following references are of record in the file of this patent:

UNITED STATES PATENTS

| Number | Name | Date |
|---|---|---|
| 2,261,969 | Lott | Nov. 4, 1941 |
| 2,384,074 | Chenicek | Sept. 4, 1945 |
| 2,388,851 | Kenyon et al. | Nov. 13, 1945 |